United States Patent [19]  [11] Patent Number: 4,883,721
Nalepka et al.                [45] Date of Patent: Nov. 28, 1989

[54] MULTI-LAYER LOW EMISSIVITY THIN FILM COATING

[75] Inventors: Raymond Nalepka, Westland, Mich.; Russell Huffer, Owatonna, Minn.

[73] Assignee: Guardian Industries Corporation, Northville, Mich.

[21] Appl. No.: 77,226

[22] Filed: Jul. 24, 1987

[51] Int. Cl.⁴ .................. B32B 15/04; B32B 17/06
[52] U.S. Cl. .................... 428/623; 428/630; 428/632; 428/633; 428/673
[58] Field of Search .......... 428/622, 623, 630, 632, 428/633, 673, 34, 434

[56] References Cited
U.S. PATENT DOCUMENTS 4,716,086 12/1987 Gillery et al. ............... 428/630
4,786,563 11/1988 Gillery et al. ............... 428/630

Primary Examiner—L. Dewayne Rutledge
Assistant Examiner—George Wyszomierski
Attorney, Agent, or Firm—Willian Brinks Olds Hofer Gilson & Lione

[57] ABSTRACT

A multi-layer of thin film for application to a transparent substrate such as glass provides excellent visible light transmission while controlling both near infra-red solar energy and far infra-red reflected energy. The film comprises a layer of sputtered zinc, tin, or bismuth oxide, a layer of sputtered silver or silver alloy, a layer of sputtered titanium or stainless steel and a final layer of zinc, tin, or bismuth oxide. The product exhibits a nominal visible light transmittance of 55% and a reflectance less than about 15% for incident light on the substrate (glass) side at visible light wavelengths and reflectance less than about 6% for incident light on the film side in the visible wavelengths. Emissivity is less than 0.15. A method of fabricating the product is also disclosed.

26 Claims, 2 Drawing Sheets

MULTI-LAYER LOW EMISSIVITY THIN FILM COATING

BACKGROUND OF THE INVENTION

The invention relates generally to multi-layer coatings for substrates and more specifically to a multi-layer thin film on glass having good visible light transmittance and low emissivity. The glass product finds particular application in residential and commercial markets.

The emphasis upon expanses of glass in modern architecture has generated a commensurate interest in adjusting the optical performance of the glass to suit widely varying requirements. Not only the visibly perceived color but also the reflectance nd transmittance of the glass across the solar energy spectrum have become objects of examination and control. Some of the means whereby such performance parameters are controlled is the application of a broad selection of materials, typically metals, by various processes such as pyrolisis, chemical vapor deposition, vacuum evaporation and cathode disintegration, i.e., sputtering. Because glass lights having thin film coatings intended for architectural use are satisfactory only when the applied coating is uniform in both composition and thickness, sputtering is the process presently favored because of its inherently uniform application characteristics.

The sputtering of transparent metallic thin films on glass substrates is not new. For example, U.S. Pat. No. 2,047,351 teaches a two step sputtering process whereby a first 100 Angstrom layer of a hard, adherent metal such as iron, cobalt, nickel, or chromium is covered by a second sputtered layer of a precious metal such as platinum, palladium, gold or silver.

U.S. Pat. No. 2,825,687 discloses a method of sputtering a multiple layer film onto a glass substrate. The first layer of material is typically an oxide of a metal such as bismuth or antimony having a thickness in the range of from 100 to 600 Angstroms and a second, outer layer of gold having a thickness of from 75 to 280 Angstroms. It is there noted that the films disclosed have the practical advantage that they transmit or absorb only a small proportion of the infra-red radiation incident thereon and reflect the greater part of such radiation.

U.S. Pat. No. 3,400,006 teaches another solar energy controlling vacuum vapor deposited alloy coating. The coating is a gold based alloy with small amounts of germanium and chromium which is deposited on plate glass to a thickness in the range of about 125 Angstroms to 225 Angstroms. Depending upon thickness, this coating provides visible light transmittance of about 40% and total solar radiation transmittance in the range of about 10 to 30%.

U.S. Pat. Nos. 3,410,710 and 3,457,106 disclose other alloy films applied by chemical means which provide control of the transmittance and reflectance of visible and infra-red light. The coatings disclosed therein are typically from about 900 Angstroms thick to several thousand Angstroms thick.

U.S. Pat. No. 4,022,947 discloses an alloy film consisting of predominantly iron, nickel and chromium coated with an oxide film of substantially the same constituents. The films are sputter coated onto a glass substrate and provide a product having a transmittance at a wavelength of 500 nanometers of about 10% to 20% and a reflectance at 3,000 nanometers of between about 40% and 65%.

The foregoing patents are an abbreviated, but representative, selection of prior art teachings relating to the sputter coating of metal and metal alloy films on glass. While the basic product and process has changed little, the performance goals and the choice of materials to achieve such specific performance goals have. Initially, much emphasis was placed on the electrical performance of the product to achieve self-deicing translucent products for use in automobile and airplane windows. Emphasis then shifted toward control of infra-red invisible light transmission for windows intended for architectural service. Such products typically provide low visible light transmission, on the order of 10 to 20%, and provide greatly reduced infra-red energy transmission. Clearly such performance parameters were intended to and do provide greatly reduced solar load and thus commensurate reductions in summer air conditioning costs.

A contemporary development in such products relates to low emissivity or low E glass. While providing significant visible light transmission, typically about 80%, such products are intended to control the escape of energy re-radiated from low temperature objects within a building. That is, while providing good visible light transmission and reduced infra-red transmission, such products also provide enhanced reflection in the far infra-red region.

SUMMARY OF THE INVENTION

The present invention is a multi-layer thin film coating applied to a glass substrate which provides control of both transmitted and reflected radiation from the ultraviolet portion of the electromagnetic spectrum through the visible range and into the infra-red portion. The multi-layer thin film coating comprises four metallic layers which are serially sputter coated to one side of a glass substrate. The first layer is preferably a metal oxide such as tin oxide, zinc oxide, or bismuth oxide. The second layer is preferably silver or a silver alloy. The third layer is preferably a titanium or stainless steel layer and the fourth layer is an additional layer of a metal oxide such as zinc oxide, tin oxide, or bismuth oxide. The thickness of the first and fourth layers is preferably between 400 and 500 Angstroms and ideally about 450 Angstroms; the second layer is preferably n the range of from about 100 to 200 Angstroms and the third layer is preferably about 100 Angstroms in thickness. The thin film coating is preferably protected by incorporating its substrate into a twin panel sealed structure having an interior region with a low dewpoint.

The sputtering process steps are accomplished in a sputtering chamber which has been initially evacuated to about $10^{-6}$ Torr and then raised to an operating pressure of approximately $2 \times 10^{-3}$ Torr by the injection of Argon. The sputtering of the first and fourth layers, that is, the oxide layers, is accomplished in the same manner and under the same pressures except that the Argon atmosphere is replaced with an atmosphere of from 80 to 100 percent oxygen. It will be appreciated that in order to provide these sputtering atmospheres and sputtering conditions, either two and preferably three or four serially connected sputtering chambers containing the desired atmospheres are provided on a single chamber having readily changeable atmospheres be utilized. With multiple chambers, the glass substrate is moved sequentially from a first oxygen filled sputtering chamber having targets of a suitable material to one or two Argon filled chambers having appropriate targets and finally either returned to the first oxygen filled chamber or further transported into an additional oxygen filled chamber having a sputtering target of the appropriate material. A single chamber will enclose all the required targets and the targets will be activated, the atmospheres changed and substrate moved as required.

The product according to the instant invention displays several unique reflectance, transmittance and emissivity parameters over the visible light and adjacent regions, particularly the infra-red region, of the electromagnetic spectrum. A coated glass substrate according to the instant invention transmits between 10 and 20 percent of the ultraviolet energy incident the glass. It also transmits between 50 and 60 percent of the visible light incident on its uncoated (glass) side while reflecting less than about 15 percent of such energy. The remaining approximately 35% of such incident energy is absorbed within the individual coatings and the glass itself. In the near infra-red region of the spectrum, the reflectance from the film side of the glass which is about 6 percent through the visible portion of the spectrum increases steadily through the infra-red region to a maximum of about 85% at a wavelength of about 10,000 nanometers (10 microns) thereby reflecting internal energy to the interior space. The emissivity of the product is within the range of from about 0.11 to 0.15 and the color characteristic of the product is neutral.

Thus it is an object of the present invention to provide a multi-layer thin metallic film coating on glass substrates.

It is a further object of the present invention to provide a multi-layer thin film coating for glass which transmits approximately 50 percent of the visible light while providing low external reflectance in the visible portion of the spectrum.

It is a still further object of the present invention to provide a multi-layer thin film coating for glass which exhibits low emissivity.

It is a still further object of the present invention to provide a multi-layer thin film coating for glass which provides good thermal performance.

It is a still further object of the present invention to provide a thin film coating for glass substrates which reflects heat radiated from the building interior as well as an adjacent protective glass panel.

Further objects and advantages of the present invention will become apparent by reference to the following description of the preferred embodiment and the appended drawings.

DESCRIPTION OF THE PREFERRED EMBODIMENT

Figure 1:
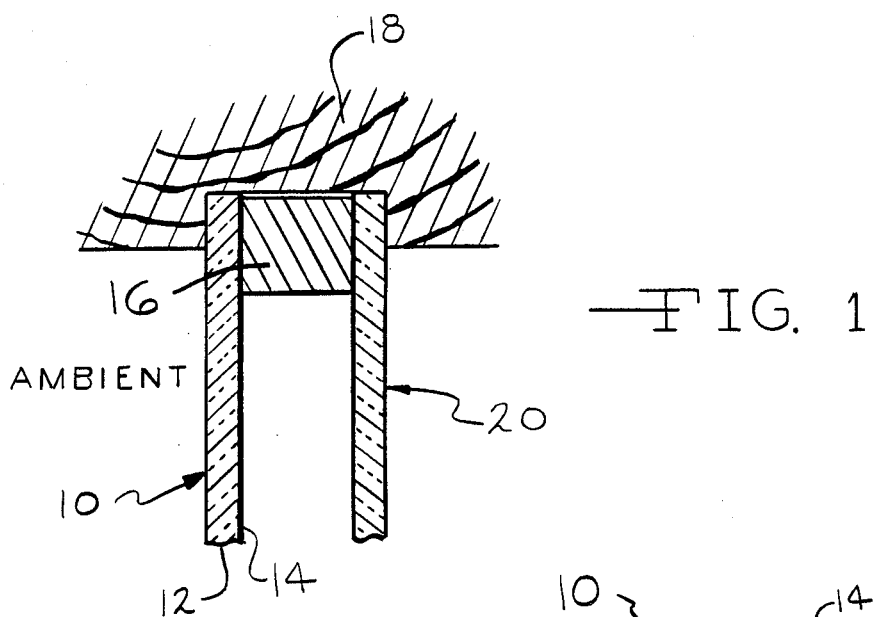
FIG. 1 is a fragmentary, perspective view illustrating the installation of a typical glass window having a thin film coating according to the present invention.

The physics of light transmission and reflectance through thin films applied to glass substrates is relatively well understood. The foundation of such understanding relates to considerations of quarter wavelength destructive interference as well as reflectance and re-reflectance from layer interfaces, the relative indices of refraction at such layer interfaces and, to a lesser extent, incident light angles. The interaction of these parameters, however, renders their engineering application complex.

The present invention represents an application of these and other optical characteristics which provides a significant number of substantially optimized parameters relating to window performance.

A review of such design parameters is appropriate. First of all, it is desirable in many commercial and residential installations to permit a significant portion of visible solar radiation to enter a living space. This is especially significant in light of the contemporary trend toward reduced glass areas as a means of energy conservation. Generally speaking, visible light transmittance of 50% and above represents an appropriate and acceptable visible light transmittance characteristic. It has also been determined that in many areas of the country, this transmittance level results in minimum annual heating, lighting and air conditioning cost, in residential buildings.

Within the visible light spectrum, lack of transmittance uniformity across the visible spectrum in a glass product will result in apparent color shifts both with regard to objects viewed through the glass and objects in the living space illuminated by light passing through the glass. Clearly uniform transmittance across the visible light spectrum is desirable. The present product responds to such a requirement, exhibiting visible light transmittance variation of slightly more than 15%.

Another consideration is the thermal performance of the product, that is, the sensible heat transmitted through an insulating window unit incorporating glass coated according to the present invention by conduction and convection, designated the R value or U value. The present product exhibits a U value no greater than 0.35 Btu/hr·ft$^{2.}$°F. in a double glazed installation comprising 3/16 inch glass thicknesses separated by a ⅜ inch air space.

As to the ultra-violet portion of the spectrum adjacent the visible light region, one's first impression is that maximum obtainable reduction in the transmission of ultra-violet light would be desirable since it generally has a deleterious effect on the integrity of both fabrics such as upholstery material, draperies and carpeting and dyes utilized in such fabrics. However, ultra-violet light is necessary for the survival and growth of plants within the living space. It has, however, been determined that plants will survive on 10 to 20% of the ultra-violet energy provided by the sun and this figure thus represents both a feasible compromise and the performance of the present invention with regard to ultra-violet transmission.

The reflectance of the glass on both its interior and exterior surfaces and at both visible and infra-red wavelengths is a significant design parameter. On the exterior, lower reflectance is aesthetically desirable to reduce glare and an undesirable mirror-like appearance. External surface reflectance below about 20% and preferably below about 15% in the visible range has been found desirable, and the present invention provides such performance. High internal reflectance in the visible portion of the spectrum results in similar mirror-like appearance which is likewise undesirable. Even lower reflectance, preferably below 10% on the interior surface is desirable and the present invention so performs.

Finally, the reflectance of glazing products in the infra-red portion of the spectrum has recently become an increasing consideration from an energy conservation standpoint. All bodies at temperatures above absolute zero radiate heat at a wavelength which is the signature of their temperature. Thus all occupants and articles within a living space radiate heat. Such radiant heat readily escapes by radiation, conduction and re-radiation through windows. In order to reduce such energy losses, the reflectance of glass in the infra-red region must be high. The present invention provides a rising reflectance throughout the infra-red region which reaches at least 85% in the far infra-red. The emissivity is thus less than 0.15 and typically about 0.13. This reflectance (and emissivity) performance significantly reduces thermal losses since the thin film coating reflects infra-red energy from all material, articles and occupants of living spaces.

In service, it has been found advantageous to protect the multiple layer thin film coating from atmospheric contaminants, water and humidity and, since the film is on the inside, i.e. living space, surface of a window, contact with objects and occupants. Such protection maintains the performance parameters set forth above and may be provided by a second parallel glass sheet spaced from the film side of the substrate as will be more fully described subsequently. While the second glass sheet does not materially modify the performance of a glass substrate/coating in accordance with the present invention, it does participate in the reflection of energy into the occupied space to the extent that there is interaction between the second glass sheet and the thin film coating. Infra-red radiation is absorbed by the second glass sheet from the interior space and heats up, re-radiating infra-red radiation to the occupied space and thin film coating. The coating reflects the radiation back to the second glass sheet which absorbs and re-radiates the energy both to the occupied space and to the thin film coating.

Referring now to FIG. 1, a multiple layer thin metallic film on a light or windowpane is illustrated and generally designated by the reference numeral 10. The windowpane 10 comprises substrate 12 which is preferably glass and a multiple layer thin film 14. The windowpane 10 is arranged such that the glass substrate 12 is exposed to the ambient and the multiple layer thin film 14 is directed toward the living space. The windowpane 10 may be coupled to a conventional peripheral seal 16 and is supported in a window sash 18 and by structural members of the building. The seal 16 is coupled to a conventional windowpane 20 disposed on the interior side of the windowpane 10. The windowpanes 10 and 20 both protect the multiple layer thin film 14 and define a sealed region as will be readily appreciated. A desiccant (not illustrated) may be placed in the sealed region to absorb water vapor and lower the dew point in accordance with conventional practice.

Figure 2:
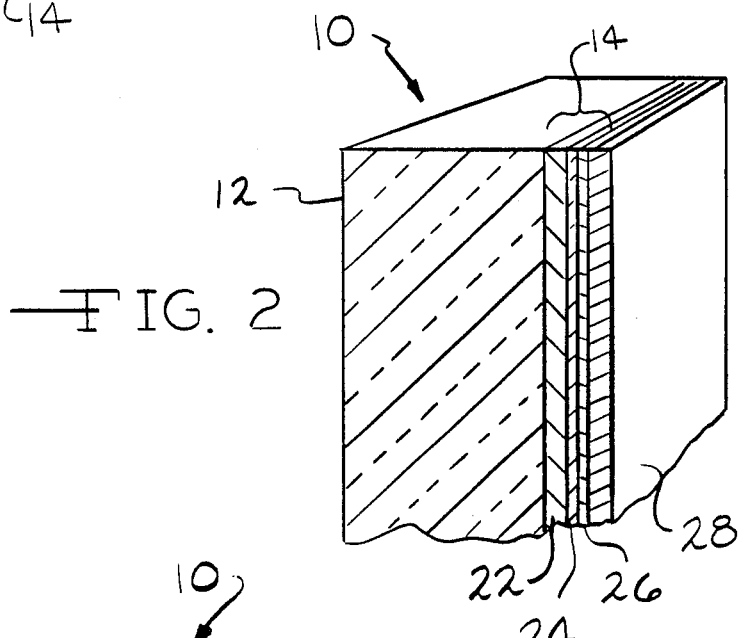
FIG. 2 is an enlarged, perspective view of a thin film coating on a glass substrate according to the present invention.

Referring now to FIG. 2, the substrate 12 is preferably any suitable composition of silica glass and is preferably clear though it may be tinted if desired. The substrate 12 need not, however, be glass as any suitable, i.e. substantially transparent, substance such as polycarbonate, acrylic or similar plastics may be utilized. The tinting however is neither an integral nor a necessary component of the windowpane 10.

A first layer 22 of the multiple layer thin film 14 is preferably a metal oxide such as tin oxide, zinc oxide, titanium oxide, indium/tin oxide or bismuth oxide. The first layer 22 is preferably applied to the glass substrate 12 by sputtering to a thickness of between 400 and 500 Angstroms, the optimum thickness being about 450 Angstroms. A second layer 24 is sputter coated to the first layer 22. The second layer 24 is preferably silver or a silver base alloy and is applied to a thickness preferably in the range of about 100 to 200 Angstroms. The silver alloy has a composition of from 5% to 10% copper with the remainder silver. A third layer 26 is preferably sputter coated to the second layer 24. The third layer 26 is a metal layer of, for example, titanium or stainless steel. The preferred stainless steel alloy is type 316 but similar stainless steel alloys may also be used. The third layer 26 is preferably about 100 Angstroms thick. A fourth layer 28 is sputter coated to the third layer 26. The fourth layer is a metal oxide again selected from the group tin oxide, zinc oxide, titanium oxide, indium/tin oxide or bismuth oxide. The fourth layer 28 is also approximately the same thickness as the first layer 22, that is, in the range of between 400 and 500 Angstroms and preferably about 450 Angstroms.

Figure 3:
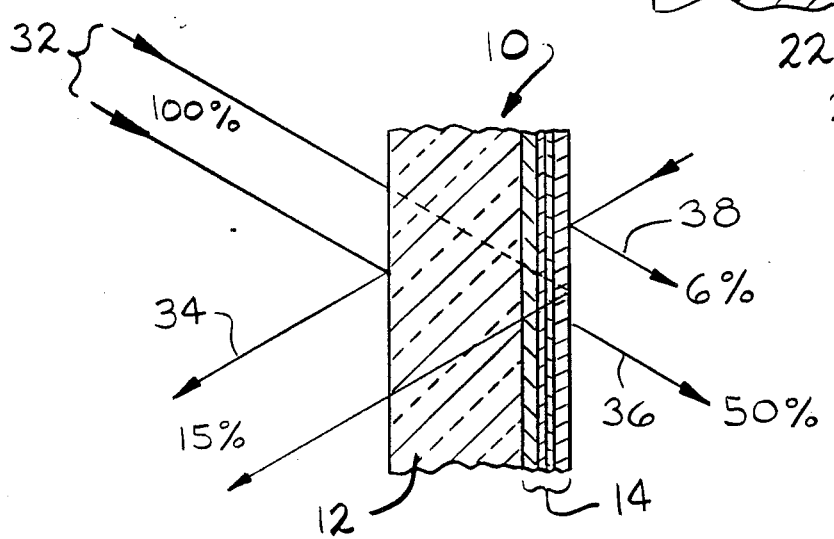
FIG. 3 is a diagrammatic representation of the performance characteristics of a glass substrate having a thin film coating according to the present invention in the visible portion of the spectrum.

Referring now to FIG. 3, a diagrammatic illustration of the performance of the window pane 10 comprising a glass substrate 12 and multiple layer thin film 14 will be described. Visible solar energy represented by the lines and arrows 32 strikes the glass substrate 12. Approximately 15% of the visible solar energy is reflected from the outside surface of the glass substrate 12 and the thin film 14 as indicated by the arrow 34. Approximately 50% of the visible solar radiation impinging upon the glass substrate 12 passes completely through the windowpane 10 as indicated by the arrow 36. The remaining approximately 35% of the visible solar energy is absorbed within the windowpane 10 and the layers and interfaces of the layers of the thin film 14, primarily the third layer 26. As to incident interior visible light, represented by the line and arrow 38, approximately 6% is reflected to the interior. Thus the inside surface of the windowpane 10 does not provide an annoying mirror-like surface but exhibits low reflectance and thus good through visibility.

Figure 4:
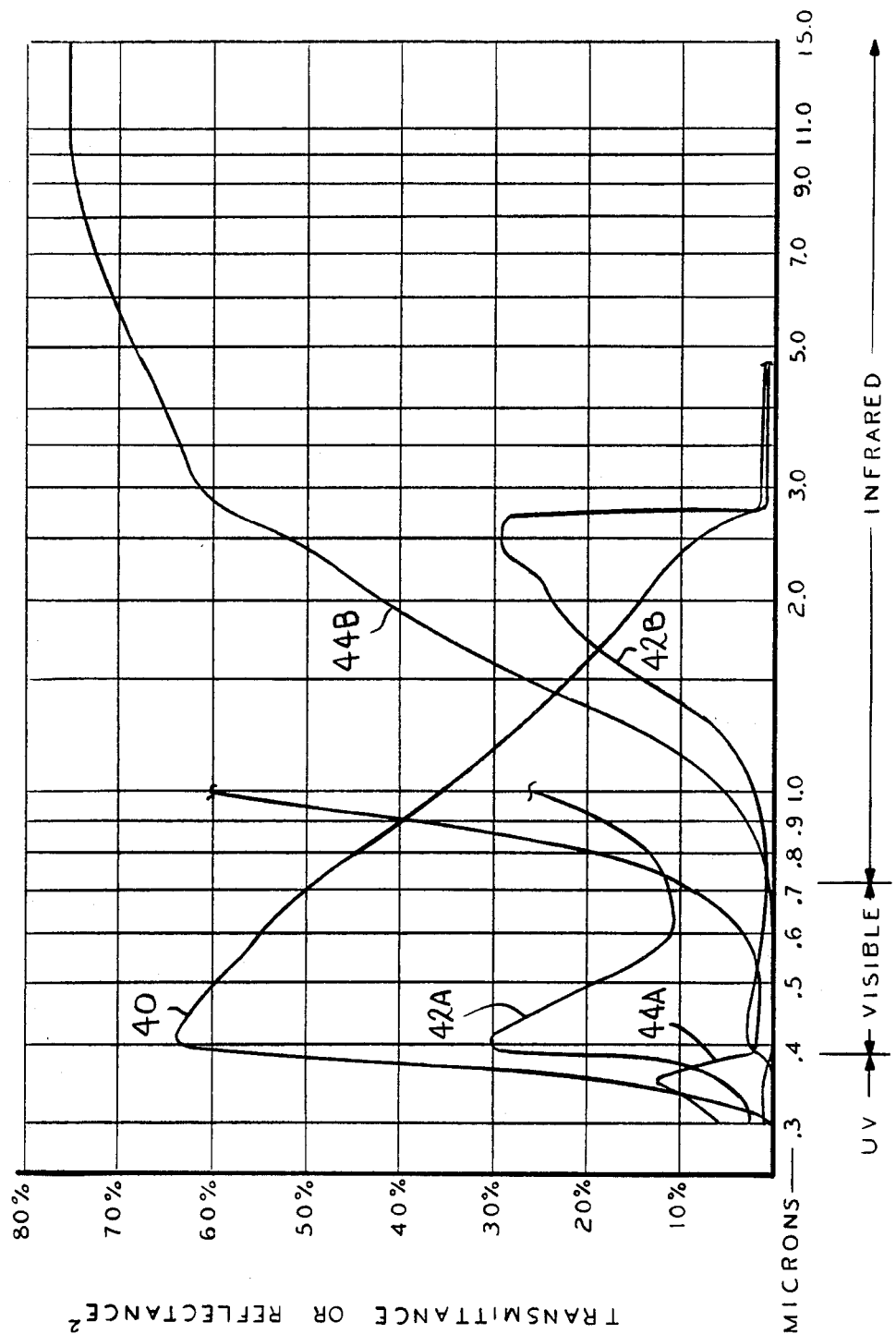
FIG. 4 is a graph which sets forth various performance characteristics of a thin film coating on a glass substrate according to the present invention.

Referring now to FIG. 4, the graph presented therein illustrates the performance of a multiple layer thin film 14 on a glass substrate 12 according to the present invention. The graph sets forth the reflectance of both the interior (coated) and exterior (uncoated) surfaces and the transmittance in a portion of the ultra-violet spectrum, through the visible light spectrum and well into the infra-red spectrum. The curve 40 represents the transmittance of the substrate 12 and film 14. The transmittance varies slightly more than 15% through the visible portion of the spectrum.

The curve 42 represents the reflectance squared of the glass side of the windowpane 10. The portion of the curve labelled 42A is multiplied by a factor of 10 for purposes of clarity whereas the portion of the curve labelled 42B is the reflectance squared not multiplied by 10. It should be noted that at approximately 2.7 microns the curve 42B rapidly falls. This is due to the infra-red adsorption characteristics of the glass substrate 12. The curve 44 represents the reflectance squared of the film side of the windowpane 10. The portion of the curve labelled 44A is the reflectance squared of the film multiplied by 10 for purposes of clarity whereas the portion of the curve 44B is the reflectance squared of the film not multiplied by 10. To the right, the graph of FIG. 4 is broken but extended well into the infra-red region and illustrates the reflectance squared of the film side of the glass as reaching approximately 76% in the far infra-red region. This portion of the curve 44B presents the emissivity of the windowpane 10 according to the present invention. Emissivity ($\epsilon$) is equal to:

$$\epsilon - = 1 - \sqrt{\text{Reflectance}^2_{film}}$$

or $$\epsilon - = 1 - \text{Reflectance}_{film}$$

and is thus equal to about 0.13. It will be appreciated that objects at a temperature of 80° F. (300° Kelvin) radiate energy at a wavelength of 10 microns and thus that the windowpane 10 according to the present invention provides excellent reflectance and emissivity in the portion of the infra-red spectrum occupied by energy radiated from objects in living spaces.

The multiple layer thin film 14 is preferably applied by serial sputtering. The sputtering process steps are accomplished in a sputtering chamber which has been initially evacuated to about $10^{-6}$ Torr and then raised to an operating pressure of approximately $2 \times 10^{-3}$ Torr by the injection of Argon. This procedure is utilized prior to sputter coating the second and third layers 24 and 26, that is, the non-oxide layers. The sputtering of the first and fourth layers, that is, the oxide layers 22 and 28, is accomplished in the same manner and under the same pressures except that the Argon atmosphere is replaced with an atmosphere of from 80 to 100 percent oxygen. It will be appreciated that in order to provide these sputtering atmospheres and sputtering conditions, it is preferable that two, three or four serially connected sputtering chambers containing the desired atmospheres be provided in which the coating steps are accomplished. The glass substrate 12 may then be moved sequentially from a first oxygen filled sputtering chamber having targets of a suitable material to one or two Argon filled chambers having appropriate targets and finally either returned to the first oxygen filled chamber or further transported into an additional oxygen filled chamber having a sputtering target of the appropriate material. Alternately, a single chamber having plural sputtering targets composed of suitable materials may be provided, the substrates serially moved into sputtering positions under specific targets and the chamber atmosphere changed as necessary to produce the desired layered product.

The foregoing disclosure is the best mode devised by the inventors for practicing this invention. It is apparent, however, that structures incorporating modifications and variations will be obvious to one skilled in the art of thin film glass coatings. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. In a multi-layer thin film for glass and other transparent substrates, the improvement comprising a first metallic oxide layer selected from the group consisting of zinc, tin, titanium, indium/tin and bismuth, a second layer selected from the group consisting of silver and silver alloy, a third layer selected from the group consisting of titanium and stainless steel and a fourth metallic oxide layer having a thickness of at least 100 Angstroms selected from the group consisting of zinc, tin, titanium, indium/tin and bismuth, wherein said thin film exhibits visible light transmittance of at least 50% and emissivity of less than 0.15.

2. The improvement of claim 1 wherein said first layer is between about 400 and 500 Angstroms in thickness.

3. The improvement of claim 1 wherein said second layer is between about 100 and 200 Angstroms in thickness.

4. The improvement of claim 1 wherein said third layer is about 100 Angstroms in thickness.

5. The improvement of claim 1 wherein said fourth layer is between about 400 and 500 Angstroms in thickness.

6. The improvement of claim 1 wherein said first layer is about 450 Angstroms in thickness.

7. The improvement of claim 1 wherein said fourth layer is about 450 Angstroms in thickness.

8. The improvement of claim 1 wherein said multi-layer thin film reflects about 15% of the incident visible radiation to the outside and absorbs about 35% of such incident visible radiation.

9. The improvement of claim 1 wherein said multi-layer thin film reflects about 6% of the incident visible radiation to the inside.

10. The improved multi-layer thin film of claim 1 wherein the substrate side reflectance is less than about 15%.

11. A radiation controlling thin film disposed on one surface of a transparent substrate, said thin film comprising, in combination,
   a first metallic oxide layer selected from the group consisting of zinc, tin, titanium, indium/tin and bismuth,
   a second metallic layer selected from the group consisting of silver and silver alloy,
   a third metallic layer selected from the group consisting of stainless steel and titanium, and
   a fourth metallic oxide layer having a thickness of at least 100 Angstroms selected from the group consisting of zinc, tin, titanium, indium/tin and bismuth,
   wherein said thin film exhibits visible light transmittance of at least 50% and emissivity of less than 0.15.

12. The radiation controlling thin film of claim 11 wherein said first and said fourth metallic layer are between about 400 and 500 Angstroms in thickness.

13. The radiation controlling thin film of claim 11 wherein said second layer is between about 100 and 200 Angstroms in thickness and said third layer is about 100 Angstroms in thickness.

14. The radiation controlling thin film of claim 10 wherein said film reflects about 6% of the incident visible radiation to the inside and at least 70% of the incident radiation in the far infra-red toward said inside.

15. The radiation controlling thin film of claim 10 wherein said film reflects about 15% of the incident visible radiation to the outside and absorbs about 35% of such incident visible radiation.

16. The radiation controlling thin film of claim 11 wherein said one surface on said transparent substrate is disposed more proximate the occupied space of a building and further including a transparent sheet article disposed between said thin film and said occupied space.

17. The radiation controlling thin film of claim 10 wherein said substrate side reflectance is less than about 15%.

18. An improved radiation controlling product comprising, in combination,
  a transparent substrate,
  a plurality of thin layers disposed on one face of said substrate, said plurality of layers including
  a first metallic oxide layer selected from the group consisting of zinc, tin, titanium, indium/tin and bismuth,
  a second metallic layer selected from the group consisting of silver and silver alloys,
  a third metallic layer selected from the group consisting of stainless steel and titanium and
  a fourth metallic oxide layer having a thickness of at least 100 Angstroms selected from the group consisting of zinc, tin, titanium, indium/tin and bismuth.

19. The radiation controlling product of claim 18 wherein said first layer is between about 400 and 500 Angstroms in thickness.

20. The radiation controlling product of claim 18 wherein said second layer is between about 100 and 200 Angstroms in thickness.

21. The radiation controlling product of claim 18 wherein said third layer is about 100 Angstroms in thickness.

22. The radiation controlling product of claim 18 wherein said fourth layer is between about 400 and 500 Angstroms in thickness.

23. The radiation controlling product of claim 18 wherein said stainless steel is type 316.

24. The radiation controlling product of claim 18 wherein said silver alloy comprises 5 to 10% copper with the remainder being silver.

25. The radiation controlling product of claim 18 wherein said product provides a visible light transmittance of at least 50% and an emissivity of less than 0.15.

26. the improved radiation controlling thin film of claim 18 wherein the substrate side reflectance is less than about 15%.

* * * * *